United States Patent [19]

Kun

[11] Patent Number: 4,706,404
[45] Date of Patent: Nov. 17, 1987

[54] OPENING AND RECOVERING TYPE NET DEVICE

[76] Inventor: Chang C. Kun, No. 3 Alley La Lane 136, Mang Ping St., Pan Chiao City, Taipei Hsien, Taiwan, R.O.C., Taiwan

[21] Appl. No.: 885,598

[22] Filed: Jul. 14, 1986

[51] Int. Cl.[4] ............................................. A01K 77/00
[52] U.S. Cl. ...................................................... 43/12
[58] Field of Search ........................................... 43/12

[56] References Cited

U.S. PATENT DOCUMENTS

| | | | |
|---|---|---|---|
| 440,568 | 11/1890 | Hebard | 43/12 |
| 941,961 | 11/1909 | Spiegle | 43/12 |
| 1,546,502 | 7/1925 | Maschmann | 43/12 |
| 2,653,404 | 9/1953 | Phaneuf | 43/12 |
| 2,683,949 | 7/1954 | Berezansky | 43/12 |
| 2,738,608 | 3/1956 | Buzzini | 43/12 |

FOREIGN PATENT DOCUMENTS 18188 12/1890 United Kingdom ................... 43/12

Primary Examiner—Gene P. Crosby

[57] ABSTRACT

A kind of opening and recovering type net device, in which the net frame includes several joints and frame rods together with the function of driving shaft and transmission assemblies to form into a retractable mechanism that can be put into an adjustable sleeve assembly. The whole net can be retracted into the adjustable sleeve assembly for carrying convenience.

1 Claim, 6 Drawing Figures

OPENING AND RECOVERING TYPE NET DEVICE

BACKGROUND OF THE INVENTION

1. Field of the Invention

This invention is in connection with a "Net Device." It particularly relates to a device which can recover the net frame in parallel, and then have the net wound around the frame and withdrawn into the adjustable sleeve assembly for the convenience of carrying.

2. Description of The Prior Art

In the typical Art:

A kind of "String switch hand-drag Net" is made up of actuating string, guiding pipe, connection sheath, buffer spring, sliding sheath, sliding block and pressure spring etc. as the main essential parts in coordination with the ordinary hand-drag nets and net frames for catch of fish. Among them, the sliding sheath and sliding block are the actuating components of the hand-drag net. The sliding sheath is mounted outside the guiding pipe between the two components. The sliding block is within the guiding pipe with a latch passing through L-shaped groove and connecting the two components to make L-shaped groove to the movement scope of the two components. Besides, when the latch disengages from groove lock, the sliding block receives the spring force released from the pressure spring to make it moving forward.

The two ends of the actuating spring are connected to the sliding block to make the actuating string a closed curve. The tail portion of the actuating spring is outside of the guiding pipe and circumvent to pass the belly of the net bottom. The actuating spring depends upon its own elastic force to make its tail in a slightly oval shape. According to the action of the sliding block, the actuating string causes the oval opening of its tail to become large or small so that the mouth of the net bottom to open large or to contract in shape to achieve the control purpose of this typical art.

In another typical art, a kind of fish net rod with an adjustable structure of length includes outer pipe, inner pipe, net for catching fish, plunger, round hoop, end sheath and handle etc. as the main components. Among them, there are:

The outer pipe is a round tube in proper length. Its one end is sheathed with a handle. At the proper position of another end, a concave ring shaped groove is installed to make its inner wall in the shape of a convex ring shaped flange. The inner pipe is a round pipe of proper length with a hollow core. The caliber of the pipe is lightly smaller than inner caliber of the outer pipe which is available for the insertion of one end of the concave ring groove, and at the entrance of that sheath, there is a concave opening. At the front end, a net for catching fish is connected. The fishing net is linked to the front end of the inner pipe. The plunger is a cylindrical rod.

Another end is installed in the concave ring shaped groove in eccentric shape. Between the concave ring shaped groove and the cylindrical end, there is a convex ring. At the proper position of the convex ring, there are two symmetrical and axial convex flanges.

The round hoop is an opening ring sheath. Its inner hole is an eccentric round hole. Its outer circumference has proper size concave and convex lines. One of the ends has radial differential faces.

The end sheath has a convex ring at the proper position of the front end of the inner wall of the end sheath. When it is inserted into the connection end of the outer pipe, it can be put into its concave groove and fixed. At its outer pipe, it can be put into its concave groove and fixed. At its outer flanges, there are concave and convex lines so that it is easily hold for rotation.

The handle is inserted and connected to the tail end of the outer pipe.

In conclusion, the above components are assembled into the structure of the outer pipe in the net for catching fish. Its round cylindrical end of the plunger is inserted into the entrance end of the inner pipe, and at the proper position of the insertion entrance, two concave points are provided to make the projection of the inner wall and fit into the plunger in fixed manner. The round hoop is inserted into concave ring shaped groove of the plunger to make the section differential faces and the convex fringe of the plunger in corresponding and opposite manner.

In the other ordinary arts, it is a kind of improvement of fishing net. It is a net body to be threaded with steel wire, main rod, a fixed base with guiding pipe, a movable base installed with flapper, a brake base, brake base of a hook, spring and casing block etc. All of the above components make up the fishing net. Its features are: That spring is connected each other with casing block. It is placed in the guiding pipe while the two ends of the steel wire is inserted into the casing block, spring and the guiding pipe, and then it is united with the movable base which is placed on the main shaft, and the movable base is located between the fixed base and brake so that the steel wire can be driven to move by the displacement of the movable base, and further the opening at the bottom of the net body will contract on account of that action. The net body drives the steel wire by the elastic action of the spring so that the opening at the bottom of the net body will expand outwards.

In a typical art, a kind of fishing net rack which is easily assembled and unloaded is made up of a net frame, assembled body, and convex square type iron sheet and handle. Its feature is: The convex rail at the connection point of net frame and block are respectively placed in the inner side of the guiding groove's catch and concave groove. Again, the square and concave type iron sheet and screws fix the net frame on the assembled body. Then, the shaft and screw shaft of the assembled body are screwed and installed, and the fishing net rack is thus formed.

SUMMARY OF THE INVENTION

This invention is to provide a kind of "Opening and Recovering type of Net Device." It is chiefly made up of the adjustable sleeve assembly and the opening and recovering net frame etc. In the adjustable sleeve assembly there installs a outer pipe and inner pipe. The inner pipe has three transmission assemblies and one driving shaft. One of the transmission assemblies is installed with a stud which can pass through the long narrow groove of the inner pipe and embed in the spiral groove of inner wall of the outer pipe. By means of turning the head of the inner pipe to drive three transmission assemblies and driving shaft to move upward and downward. At the same time, the net frame follows the upward or downward movement of the transmission assemblies to open or close.

The main object of this invention is to install the frame rods with joints and first transmission assembly to form a net frame. And to fix the connecting rods with the lowest frame rods of the net frame and the second transmission assembly. By means of the joints, connecting rods, and transmission assembly to activate the net frame to be expanded as spreading form for usage or closed in parallel form for recovering into the adjustable sleeve assembly for the convenience of carrying.

Another object of this invention is to provide an adjustable sleeve assembly. By means of the stud of the third transmission assembly passed through the long narrow groove of the inner pipe, and embedded in the spiral groove of inner wall of the outer pipe to drive the transmission assemblies and net frame upward or downward along the long narrow groove of the inner pipe and spiral groove of the outer pipe in the adjustable sleeve assembly.

Another object of this invention is to install the three transmission assemblies respectively on the driving shaft. They are fixed or cased in different styles to make the driving shaft to be driven by the transmission assemblies and to activate the net frame to spread or close. At the same time, they will not slip out of the adjustable sleeve assembly.

DESCRIPTION OF THE PREFERRED EMBODIMENT

Figure 1:
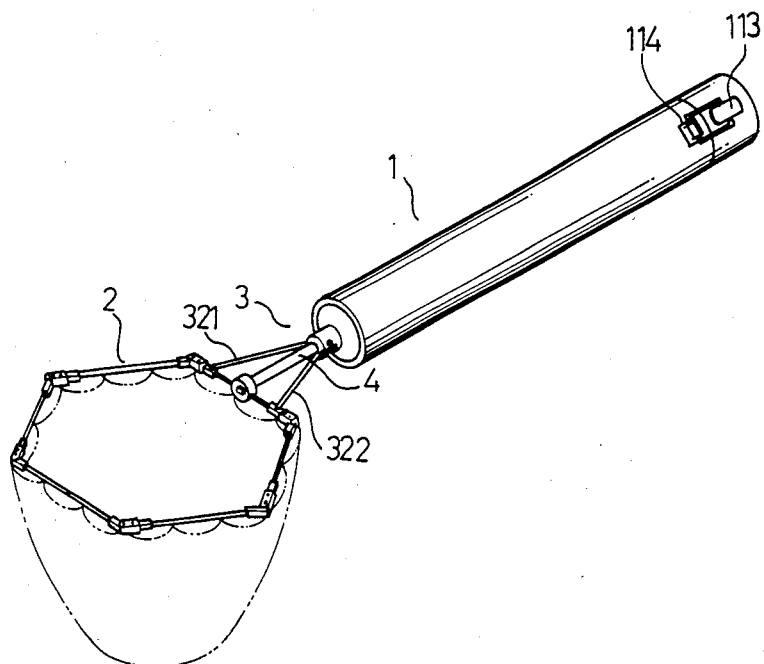
FIG. 1 is a perspective view of this invention.

From FIG. 1 we know that this invention comprises mainly an adjustable sleeve assembly 1, an opening and recovering type net frame 2, a transmission mechanism 3, a driving shaft 4, etc. The net frame 2 is a multi-angle structure which consists of an even number of frame rods 21 to be connected by the joints 22, The lowest end frame rods is inserted and fixed into the first transmission assembly 31. The transmission mechanism 3 and the driving shaft 4 are fixed or cased, and are put within the adjustable sleeve assembly 1.

Referring to FIG, 2 the frame 2 is formed by the connection of the frame rod 21 with the joint 22. That joint has an opening 221 at one end of the main arm 220; there is a swinging arm 222 at the opening 221 of which the angle is limited. At the other end of the main arm 220, there is mounted with a casing arm 223.

Figure 2:
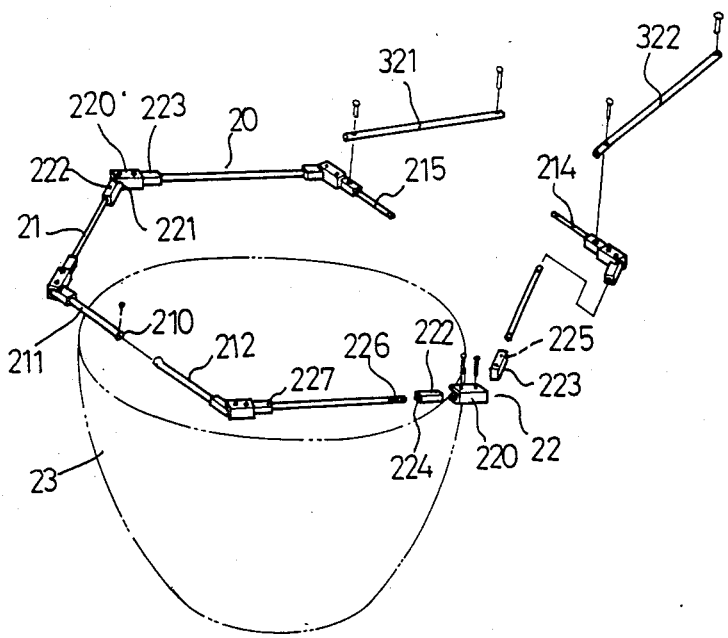
FIG. 2 is a disassembled view of the net frame according to invention.

At the ends of both the swinging arm 222 and casing arm 223, there are respectively tapped with inner threads 224 and 225. The whole frame 2 is formed by frame rod 21 with outside threads 226 and 227 on both ends; they are screwed and fixed in the above threads 224 and 225. The top frame 21 of net frame 2 is riveted by flat head short frame rod 211 and 212 each other. The lowest frame rod 21 of the net frame 2 is fixed properly by suitable short frame rod 214, 215 into the grooves at the opposite side of the first transmission assembly 31. The net 23 is hung on the frame rod 21, short frame rod 211, 212, 214, 215 (as shown in FIG. 2).

Figure 3:
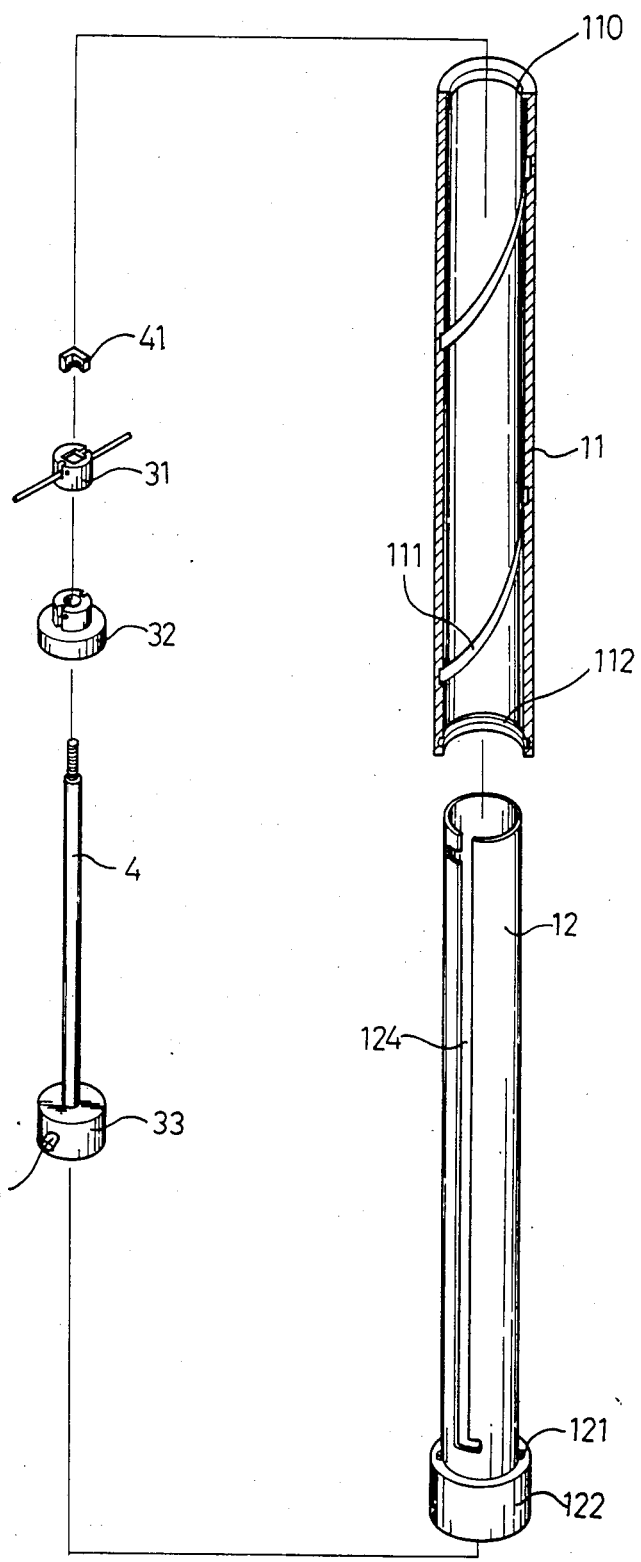
FIG. 3 is a disassembled view of the adjustable sleeve assembly in this invention.
Figure 4:
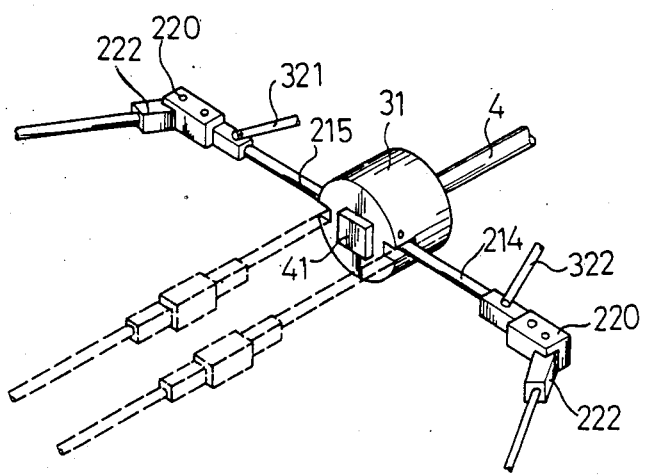
FIG. 4 illustrates the relationship among the transmission mechanism, the driving shaft and the opening and recovering frame of the present invention.

The adjustable sleeve assembly 1 as shown in FIG. 3 is composed of an outer pipe 11 and an inner pipe 12. The outer pipe 11, on its inner wall, has spiral grooves 111. In its lower end, there is inner ring-shaped groove 112 so as to be fitted with the key 121 in the opposite position of the inner pipe 12. The upper part of the inner pipe 12 is inserted into the outer pipe 11 to form the lowest end of the inner pipe 12 as a rotation head 122. By rotating the rotation head 122 of the inner pipe 12, it turns within the outer pipe 11. At the lower ends of the outer pipe 11 and inner pipe 12, there are locking devices 113 and 114 to fix the two pipes 11 and 12 without any rotation.

Figures 5, 6:
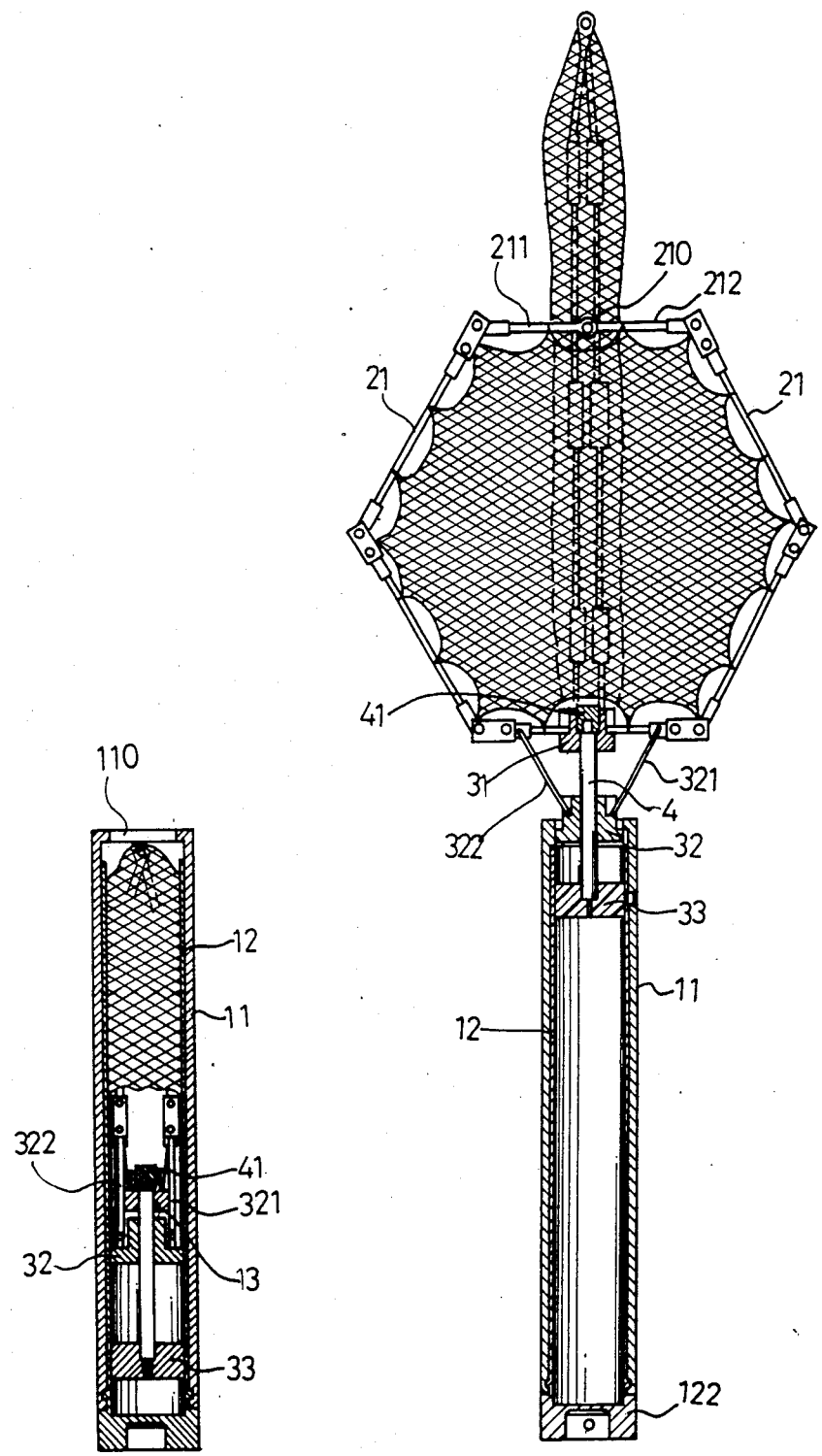
FIG. 5 is a sectional view of the adjustable sleeve assembly after the net frame being recovered into the sleeve.
FIG. 6 illustrates the opening and recovering positions of the invention.

The transmission mechanism 3 includes the first transmission assembly 31, the second transmission assembly 32 and the third transmission assembly 33. They are respectively encased or fixed on the driving shaft 4. The third transmission assembly 33 is equipped with a stud 331. That stud 331 passes through the long narrow groove 124 of inner pipe 12 and then is embedded in the inner wall spiral groove 111 of the outer pipe 11. The net can be opened by turning the rotation head 122 of the inner pipe 12 clockwise with one's right hand while one's left hand holds the outer pipe 11, the third transmission assembly 33 will be driven to move along the spiral groove 111 of the outer pipe 11 and the long narrow groove 124 of the inner pipe 12 to rise or descend, and then it drives the first and second transmission assemblies 31, 32 and the driving shaft 4, to move simultaneously as well as the entire net 23. The second transmission assembly 32 is sleeved on the middle part of the driving shaft 4 without being fixed. It has two cascades. In its central part, there is a hole for mounting the driving shaft 4. At the both sides of the smaller diameter part of the second transmission assembly, there are grooves, in which the connecting rods 321, 322 are pivotally connected in the grooves of second transmission assembly 32, and are pivotally connected respectively with the casing arms 223 of the short frame rods 214, 215 of the net frame 2. When the second transmission assembly 32 is moved spirally upward, the larger diameter part of it is to be blocked by the inner flange 110 of the outer pipe 11, but of the second transmission assembly 32 will extend out of the out pipe 11, while the first transmission assembly 31 continues moving upward with the transmission assembly 33 and driving shaft 4 until the upward force is stopped by the connecting rod 321, 322, and the end of the long narrow groove 124 of the inner pipe 12, and then the net frame 2 is fully opened shown in FIG. 6. To recover the net, the user should hold the outer pipe 11 with his left hand, and should use the right hand to turn the inner pipe 12 counter-clockwise slowly; then, the first and second transmission assembly (31, 32) (20) will be withdrawn into the adjustable sleeve assembly 1.

At the both opposite side of the first transmission assembly 31, there opens grooves for pivotally connecting the short frame rods 214, 215 therein with sunk screws. The center part of the assembly 31 has a square hole for receiving a square head 41, which is screwed on the top of the driving shaft 4.

To open the net device of this invention, all the user has to do is to turn clock-wise the rotation head 122 at the lower end of the inner pipe 12 of the adjustable sleeve assembly 1; then, the transmission mechanism 3 and driving shaft 4 inside the adjustable sleeve assembly 1 will rise simultaneously. At the same time, they drive the net frame 2 to open and expand so that it becomes an opened fishing net.

To recover the fishing net, the user should turn counter-clockwise the rotation head 122 of the inner pipe 12 to make the first transmission assembly 31 to follow the driving force of the third transmission assembly 33 will descend so that the net frame 2 to close up gradually. The connecting rods 321 and 322 on the second transmission assembly 32 also gradually close together. When reaching a specified extend, the second transmission assembly 32 will follow the movement of the first transmission assembly 31 to descend and retract inwards; then, roll up the net; so, the whole transmission mechanism, the net frame and the net are all recovered into the adjustable sleeve assembly 1.

Moreover, this invention may be, if necessary, furnished with a wedge shape member on the rotation head 122, being fixed with a pin so as to have the whole net fixed on the ground.

What is claimed is:

1. An opening and recovering type net device comprising mainly an adjustable sleeve assembly, an opening and recovering type net frame, a transmission mechanism including a plurality of transmission assemblies, a driving shaft, and a net; and said adjustable sleeve assembly including an outer pipe and an inner pipe; and the inner wall of said outer pipe having a spiral groove; and in its lower end, there is an inner ring-shaped groove so as to be fitted on a key in an opposing position of the inner pipe; and the inner pipe having a long narrow groove for the passing of a stud of a third transmission assembly and embedding in the spiral groove of the outer pipe; and said transmission mechanism including a first transmission assembly, a second transmission assembly, and a third transmission assembly, which are respectively disposed on the driving shaft; and said second transmission assembly being formed into a double cascade shape; and at the both sides of the second transmission assembly, there are grooves for the fixation of connecting rods, and each other end of the connecting rod is aligned with a casing arm of a short frame rod of the net frame; and at the both opposite sides of the first transmission assembly, there are also open grooves for the insertion and fixation of the short frame rods of the net frame which is assembled with frame rods and joints; and by means of turning a rotation head at the bottom of said inner pipe of the adjustable sleeve assembly, the three transmission assemblies and said driving shaft can rise or descend simultaneously, at the same time, the drive the opening and recovering type net frame to expand for usage or to close for recovering into the adjustable sleeve assembly for the convenience of carrying.

* * * * *